United States Patent [19]
Nobis

[11] Patent Number: 4,774,905
[45] Date of Patent: Oct. 4, 1988

[54] APPARATUS FOR INTERNALLY COATING PIPES

[75] Inventor: August Nobis, Morsen-Twistringen, Fed. Rep. of Germany

[73] Assignee: Hermann Hanschen, Twistringen, Fed. Rep. of Germany

[21] Appl. No.: 40,774

[22] PCT Filed: Aug. 7, 1986

[86] PCT No.: PCT/EP86/00468
§ 371 Date: Apr. 29, 1987
§ 102(e) Date: Apr. 29, 1987

[87] PCT Pub. No.: WO87/00906
PCT Pub. Date: Feb. 12, 1987

[30] Foreign Application Priority Data
Aug. 8, 1985 [DE] Fed. Rep. of Germany ....... 3528446

[51] Int. Cl.$^4$ .................. B05B 17/00; B05C 5/00
[52] U.S. Cl. .................. 118/304; 118/306; 118/408; 118/DIG. 10; 427/236
[58] Field of Search ............... 118/306, 408, DIG. 10, 118/304; 427/236

[56] References Cited

U.S. PATENT DOCUMENTS

| | | | |
|---|---|---|---|
| 2,908,248 | 10/1959 | Brant | 118/408 |
| 3,044,136 | 7/1962 | Perkins | 118/306 X |
| 3,058,137 | 10/1962 | Doyle et al. | 118/408 X |
| 3,125,464 | 3/1964 | Harmes | 118/408 X |
| 3,333,311 | 8/1967 | Matheny et al. | 118/408 X |
| 3,885,521 | 5/1975 | Von Arx | 118/408 X |
| 4,010,712 | 3/1977 | Dugas | 118/306 |
| 4,329,937 | 5/1982 | Holland | 118/306 X |

FOREIGN PATENT DOCUMENTS

| | | | |
|---|---|---|---|
| 0094819 | 11/1983 | European Pat. Off. | |
| 1571793 | 6/1969 | France | |
| 2185942 | 1/1974 | France | |
| 0677771 | 8/1979 | U.S.S.R. | 118/306 |

*Primary Examiner*—Shrive Beck
*Assistant Examiner*—Alain Bashore
*Attorney, Agent, or Firm*—Merchant, Gould, Smith, Edell, Welter & Schmidt

[57] ABSTRACT

An apparatus for coating the internal surfaces of pipes comprises two pigs which engage against the internal pipe surfaces and are movable through the pipe, and which define an intermediate zone therebetween for receiving the coating material. A spraying device capable of spraying material in the radial direction is connected to the intermediate zone via a material feed line. Upon being drawn through the pipe, the coating material is fed to the spraying device which atomizes the material and conveys it to the internal surfaces of the pipe.

15 Claims, 3 Drawing Sheets

APPARATUS FOR INTERNALLY COATING PIPES

TECHNICAL FIELD

The invention relates to an apparatus for the internal coating of pipes having a first and second pig which engage the internal pipe surface and are movable through the pipe, having an intermediate zone between the two pigs for receiving coating material, whereby during the movement the pigs are pressurized and the coating material is forced out of the intermediate zone onto the internal surfaces of the pipe.

BACKGROUND OF THE INVENTION

In the chemical field, in particular in natural gas and oil transportation, water containing aggressive components (sulfur, salt) occurs in considerable quantities. This water is transported through welded steel pipes at times under very high pressures (up to 200 bar). If these are not isolated from the inside, they are destroyed by corrosion in a short time, which adversely affects the operation and considerably endangers the environment.

To reduce corrosion it has been suggested to install plastic tubes within the steel pipes. This, however, leads to an undesirable reduction of the pipe cross section.

For the prevention of this effect, it is known to coat the interior of pipes with material which is resistant to the accumulated aggressive media. This coating is carried out in pipes of large diameters by means of mobile vehicles which spray coating material.

This is not possible for pipes of small diameters. Instead, they may be coated, for example, by a package consisting of two pigs between which the in general fluid coating material is located, which is drawn back and forth through the pipe. Such a procedure has the disadvantage that the weak points which occur in the region of uneven parts of the internal pipe surface, particularly at the weld seams, where the coating material is stripped off by the second pig and thus form attack points for the aggressive media.

Another process for coating is airless paint spraying (the so-called airless-process). In this, the coating material from a tank located outside the pipe is pumped to a nozzle in the pipe by means of a high pressure pump and a high pressure tube. The high pressure in the tube causes the material to be sprayed and coat the internal surface of the pipe. The disadvantage of such a system is that, as a result of the considerable pressure loss caused by friction in the high pressure pipe only limited pipe lengths may be coated.

Even in oil and natural gas transportation, piplines are provided for the transport of required substances which may in parts extend underground for long stretches and so the new coatings of the inner tube surfaces required at regular yearly or half-yearly intervals causes a considerable expenditure. In order to effect the interval coating by one of the known apparatuses, stretches of about 300 m are dug up and the tube cut apart.

SUMMARY OF THE INVENTION

An object of the invention is therefore to provide an apparatus which enables very long thin pipes to be uniformly and reliably coated on the inside without permitting the coating to become too thin or completely broken at irregularities of the internal pipe surface.

This object is achieved by providing a spraying device which is movable through the pipe and which is connected to the intermediate zone between the pigs by means of a material feed line and the coating material from the intermediate zone is used for spraying.

By the use of such an apparatus, the coating material is carried along in the immediate vicinity of the spraying device so that practically no pressure loss takes place on the delivery to the spraying device; at the same time, the atomizing spraying device creates a non-contact, even inner coating of the pipe even at the weld seams and other uneven parts of the inner surface of the pipe.

Moreover, the pigs, which engage elastically with the pipe inner surface, spread the coating material located in the intermediate zone on the pipe inner surface as a thin base film so that pores and indentations that are difficult for the spraying device to access are already coated with the coating material when the spraying device reaches such regions.

Regions, particularly at the weld seams, from which the second pig removes the coating right down to a base film, are further covered with new coating material by the spraying device which preferably acts radially.

Using the apparatus of the invention pipes of lengths several times those of which may be sprayed with conventional equipment, can be spray coated. The number of expensive excavation points, in the case of pipes extending underground, can thus clearly be reduced. By reason of the even internal coating, it is also possible, if necessary, to increase the time intervals between two successive coating operations.

A particular advantage is obtained when the spraying device has a spinning wheel or a rotating nozzle which is caused to rotate by compressed air from a compressed air reservoir. Alternatively, an electric motor can be used as the drive or a non-rotating spray nozzle may be provided.

In order to atomize the coating material, the material may be pressurized either by compressed air from the compressed air reservoir or by feed pressure from an electric conveyor pump which, by means of a conveyor element which projects into the intermediate zone, forces coating material through the material feed line to the spray nozzle.

Preferably, pull cords are attached to the second pig and extend through the intermediate zone and the first pig and are coupled to a cord winch located outside the pipe. By pulling the pull cords, the coating material in the intermediate zone is pressurized and fed to the spraying device through the material feed tube by the consequent increased pressure. A conveyor pump for the transportation of the coating material to the nozzle of the spraying device is not necessary in this embodiment of the invention.

It is advantageous, if the compressed air tube in the intermediate zone and between the compressed air reservoir and the first pig is intrinsically elastic and spirally wound. It can then adapt itself to the reducing quantity or respectively the reducing distance of the two pigs.

In order to allow for rotational movement of the pigs, the attachments of the compressed air feed tube may be via rotatable couplings.

Further preferred features of the invention are defined in the dependent claims.

BRIEF DESCRIPTION OF THE DRAWINGS

In the following, three working embodiments of the invention are described in detail with reference to the accompanying drawing. It shows.

DETAILED DESCRIPTION OF THE INVENTION

A pipe 10 is to be provided on its inner surface with an internal layer of coating material 16.

Figure 1:
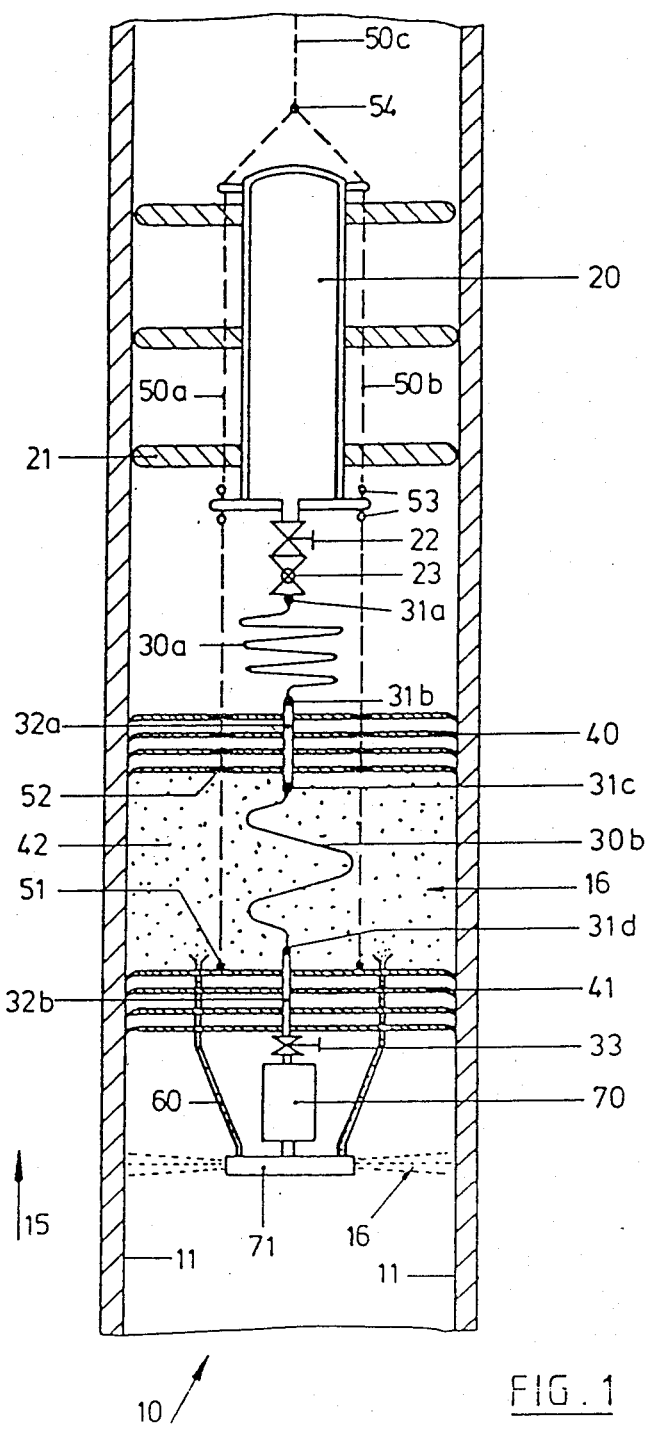
FIG. 1 a longitudinal cross-section of a pipe containing an embodiment of the apparatus of the invention.

The apparatus used for the internal coating according to FIG. 1 has a compressed air reservoir 20 with a pressure of, for example, 200 bar which is secured by slide collars 21. It is provided with a high pressure shutoff valve 22 which a pressure reducer 23 is connected. The outlet of the pressure reducer is located on the axis of the axially symmetrical apparatus and consequently also on the axis of the pipe.

An elastic, spirally-wound pressure tube 30a is attached to the pressure reducer 23. The spiral winding is concentric with the axis of the apparatus and the pipe. The tube 30a may also rotate freely since it is attached to the pressure reducer via a rotatable coupling 31a.

The end of the pressure tubing 30a opposite to the compressed air reservoir 20 is connected via a rotatable coupling 31b to a solid conduit section 32a in a first pig 40. The pig 40 consists of several spaced layers which completely occupy the cross sectional area of the pipe and have elastic outer edges which engage against the inner surface of the pipe.

The solid conduit section 32a of the pressure tubing 30 runs along the axis of the first pig 40. On the other side of the pig 40, a further spirally-wound section 30b of the pressure tubing 30 is located concentrically to the axis of the apparatus and is attached to the conduit section 32a via a rotatable coupling 31c. This leads to a solid conduit section 32b located in a second pig 41, and is attached thereto via a rotatable coupling 31d. The second pig 41 is constructed in the same way as the first pig 40 and likewise occupies the entire cross sectional area of the pipe. An intermediate zone 42 is located between the two pigs 40, 41 which is occupied by coating material 16.

Two pull cords 50a, 50b are attached to the second pig 41 by means of eyelets 51. The pull cords 50a, 50b extend symmetrically parallel but non-centrally from the second pig 41, through the intermediate zone 42 to the first pig 40 through which they extend via sealing bushings but to which they are not attached. The pull cords 50a, 50b then extend further to eyelets 53 on the compressed air reservoir 20. From there the pull cords 50a, 50b separately extend from further eyelets 53 to a common eyelet 54 located on the axis of the apparatus, and from this an axially-extending pull cord 50c extends to a cord winder (not shown) at the end of the pipe 10.

The solid conduit 32b of the pressure tubing 30 which extends through the second pig 41 is provided with a shutoff valve 33 on the side of the pig 41 opposite to the intermediate zone 42. From there, the compressed air tubing 30 extends to spray apparatus 70, 71 which is rigidly fixed to the second pig 41 and which comprises a compressed air turbine 70 carrying a rotational nozzle 71.

The pig 41 additionally has coating material feed tubes 60 extending through it and the open ends of the tubes communicate with the intermediate zone 42 and with the rotational nozzle 71.

The internal coating of the pipe 10 takes place in the following manner:

After cleaning of the internal surface 11 of the pipe the entire apparatus is pulled through the pipe by means of a cord winch in the direction opposite to the coating direction (arrow 15). Alternatively, the pull cord 50 may be shot or pulled through the pipe 10. Next, the individual parts are then combined with each other in a separate, additional pipe piece (not shown) and the intermediate zone between the pigs 40 and 41 filled with coating material 16.

A preferably steplessly acting winch pulls the compressed air reservoir 20 and the second pig 41 through the pipe 10 via pull cords 50c, 50a, 50b at a predetermined speed. The first pig 40 is not pulled by any of the pull cords but it is pushed in the direction of pull by the coating material 16 which dams up in front of the second pig 41 in the intermediate zone 42. The pressure thereby generated drives the coating material 16 through the material feed tubes 60 into the rotary nozzle 71 of the compressed air turbine 70. The compressed air drives the compressed air turbine 70 upon corresponding actuation of the shutoff valves 22, 23 at a rotational speed of, for example, 20,000 rpm. The high rotational speed causes the coating material 16 to be atomized. A stream of atomized coating material 16 is then sprayed from the rotary nozzle 71 onto the internal surface 11 of the pipe.

Upon movement of the apparatus through the pipe 10, the second pig 41 spreads further coating material behind it from the intermediate zone 42 directly onto the internal surface of the pipe, and the spray coating from the spray equipment then forms on this primer layer.

As coating proceeds, the supply of coating material 16 in the intermediate zone 42 between the two pigs 40, 41 diminishes. The coating space 42 thus becomes smaller, and the two pigs 40, 41 draw closer to each other. The pressure tube 30b in the intermediate zone 42 then has a smaller axial length to traverse; the spiral windings are thereby pressed together.

Conversely, the distance between the two rotatable couplings 31a, 31b, and therefore the distance between the pressure reducer 23 of the compressed air reservoir 20 and the first pig 40 increases, because the distance between the compressed air reservoir 20 and the second pig 41 remains constant. The section 30a of the compressed air tube 30 must consequently bridge a longer axial distance, and its spiral windings are therefore drawn apart.

The rotational couplings 31 in the compressed air tubing 30 are provided to accommodate forces which may arise as a result of rotary motions of the pigs 40, 41.

Figure 2:
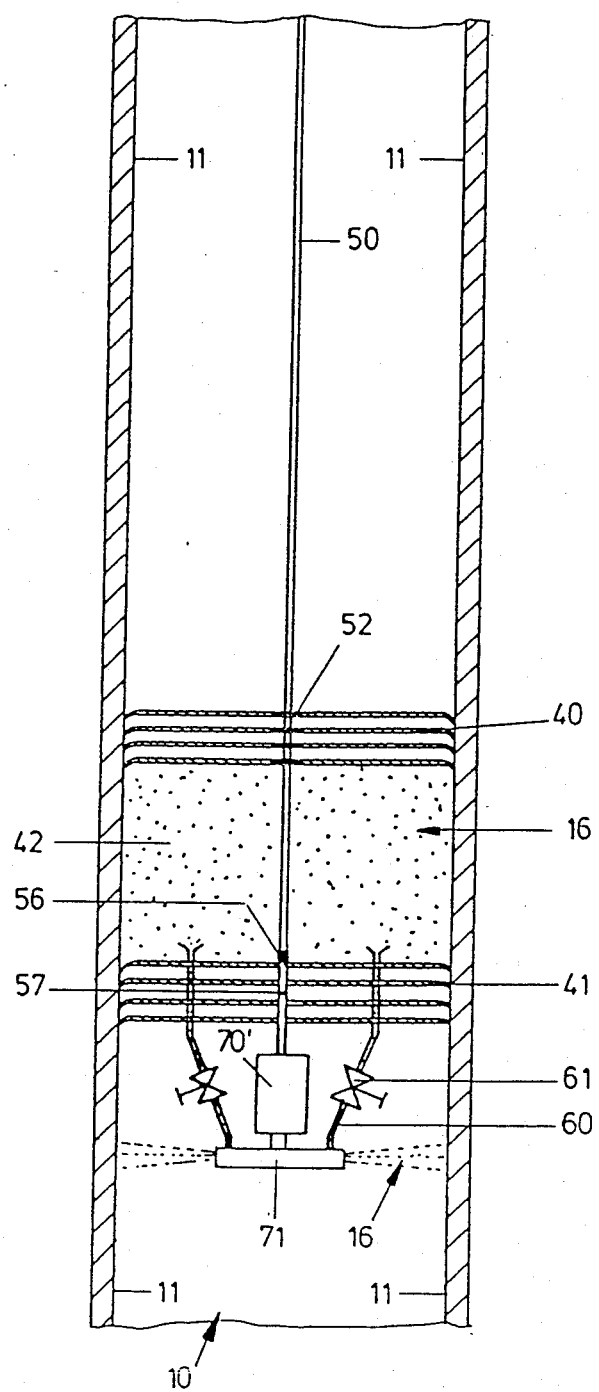
FIG. 2 a longitudinal cross-section of a pipe containing a second embodiment of the apparatus of the invention.

The second embodiment shown in FIG. 2 is largely similar to the first embodiment. Instead of the compressed air supply, an electric motor 70' is located in the spray device 70', 71. This is provided with current through an electrical lead 57, which is provided as a core in the pull cord 50. The pull cord 50 extends through sealing bushings in the first pig 40, through the intermediate zone 42, and is attached to the second pig 41 at the attachment point 56.

Metering valves 61 are provided in the coating material feed tubes 60 for better matching of the coating material flow with the coating speed (speed of progression of the apparatus through the tube) and adjustment of the coating thickness on the internal surface 11. A normally desirable coating thickness is about 400 μm.

Figure 3:
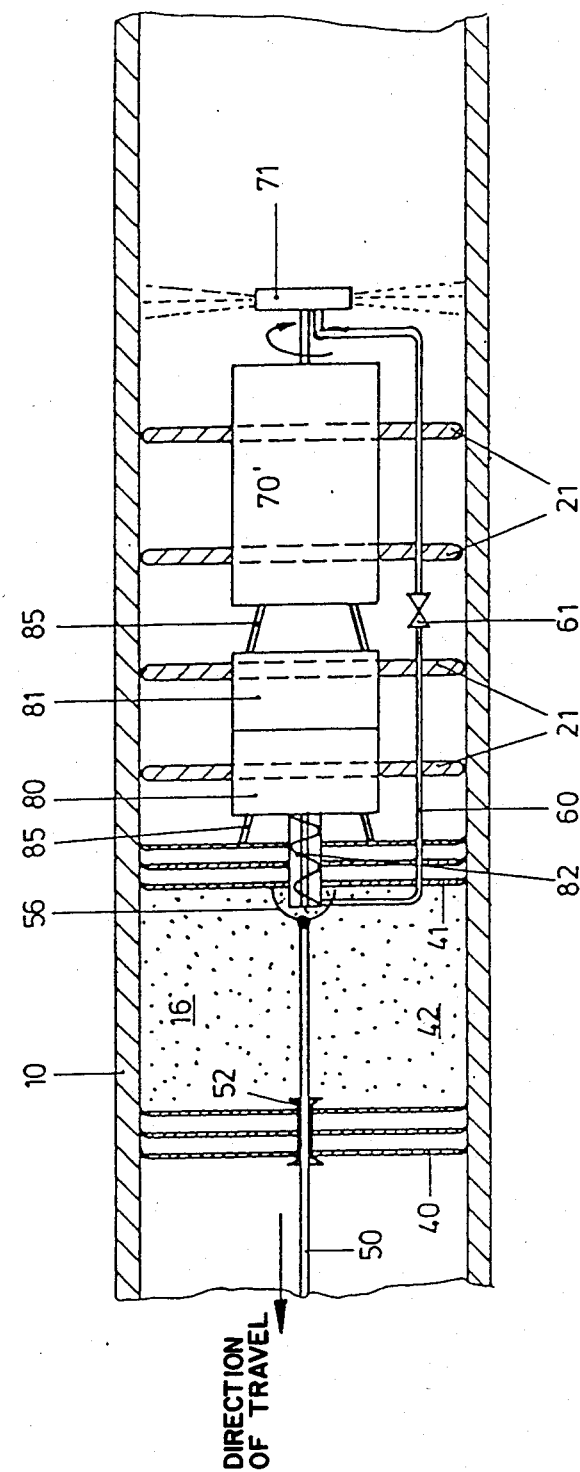
FIG. 3 a longitudinal cross-section of a pipe containing a third embodiment of the equipment.

The embodiment shown in FIG. 3 comprises, if necessary, a first pig 40 and a second pig 41, between which the intermediate zone 42 is provided and which is filled with the coating material 16. A central eyelet 56 is located on the second pig 41 on which the pull cord 50 is fastened. The pull cord extends through the intermediate zone 42, through a central, sealing bushing 52 in the first pig 40 and to an end of the pipe 10. The pull cord 50 is movable relative to the sealing bushing 52 so that the first pig 40 may approach the second pig 41 as the coating material 16 is depleted from the intermediate zone 42.

A booster pump 80 is located behind the second pig in the pulling direction by means of coupling links 85. The pump is driven by an electric motor 81 and is centrally positioned in pipe 10 by sliding elements 21. A booster element 82 of the booster pump 80 extends rearwardly from the electric motor 81 through the second pig 41 and feeds the coating material 16 into the opening of the material feed line 60, which in turn extends through the second pig 41, via a metering valve 61 for the coating material to the nozzle 71 of the spray device. The spray device 70', 71 is coupled via coupling links 85 behind the booster pump 80, 81 and is positioned centrally in the tube 10, if necessary, by means of sliding elements 21. The nozzle 71, which is rotated by an electric motor 70', then sprays the coating material uniformly against internal surface of the pipe.

I claim:

1. Apparatus for internally coating pipes comprising a first and a second pig which engage the internal surface of the pipe and are moveable through the pipe to form a primer layer on the internal pipe surface, an intermediate zone between the two pigs for receiving coating material, said coating material being pressurized when moving the pigs to drive said coating material from the intermediate zone through a material feedline to a spray device structurally attached to the second pig, said spraying device spraying coating material received from the intermediate zone onto the primer layer formed by the pigs.

2. Apparatus according to claim 1, characterized in that the spraying device (70, 71) is located behind the second pig (41) and that the material feed line (60) extends through the second pig (41).

3. Apparatus according to claim 1, characterized in that a pull cord (50) is fixed to the second pig (41) and sealingly extends through the first pig (40) via sealing bushings (52) and is connected to a cord winch at one end of the pipe (10) for movement of the pigs (40, 41).

4. Apparatus according to claim 1, characterized in that the spraying device (70, 71) is connected to a compressed air reservoir (20) via a compressed air tube (30a, 30b) for the spraying of coating material (16).

5. Apparatus according to claim 4, characterized in that the spraying device (70, 71) comprises a rotary nozzle which is rotatably driven by means of compressed air from the compressed air reservoir (20) or by means of an electric motor (70').

6. Apparatus according to claim 4, characterized in that the compressed air reservoir is located in front of the first pig (40) or between the second pig (41) and the spraying device (70, 71) and is slidable in the pipe on sliding elements (21).

7. Apparatus according to claim 6, characterized in that the compressed air reservoir (20) is arranged before the first pig, that the compressed air tube (30a, 30b) connecting the compressed air reservoir (20) and the spraying device (70, 71) extends through the first pig (40) and the intermediate zone (42) and is spirally wound in the intermediate zone (42).

8. Apparatus according to claim 1, characterized in that an electric booster pump (80, 82) is provided which enhances the flow of coating material (16) from the intermediate zone (42) through the material feed line (60) to the nozzle of the spraying device (70', 71).

9. Apparatus according to claim 8, characterized in that the booster pump (80, 82) is located in front of the first pig (40) or between the second pig (41) and the spraying device (70', 71) and contains a booster element (82) which projects through one pig (40, 41) into the intermediate zone and forces the coating material (16) into the material feed line (60) to the nozzle of the spraying device (70', 71).

10. Apparatus according to claim 1, characterized in that a metering valve (61) is arranged in the material feed line (60).

11. Apparatus for internally coating pipes having a first and a second pig which engage the internal pipe surfaces and are movable through the pipe, having an intermediate zone between the two pigs for receiving coating material, whereupon during the movement the material between the pigs is pressurized and the coating material is forced out of the intermediate zone onto the internal surfaces of the pipe, characterized in that a spraying device which is movable through the pipe is located behind the second pig and is connected to the intermediate zone between the pigs via a material feed line extending through the second pig where said spraying device sprays coating material from the intermediate zone.

12. Apparatus for internally coating pipes having a first and a second pig which engage the internal pipe surfaces and are movable through the pipe, having an intermediate zone between the two pigs for receiving coating material, where movement is induced by a pull cord is fixed to the second pig and sealingly extends through the first pig via sealing bushings and is connected to a cord winch at one of the pipe for movement of the pigs; during movement, the material between the pigs is pressurized and the coating material is forced out of the intermediate zone onto the internal surfaces of the pipe, characterized in that a spraying device which is movable through the pipe is connected to the intermediate zone between the pigs via a material feed line and sprays coating material from the intermediate zone.

13. Apparatus for internally coating pipes having a first and a second pig which engage the internal pipe surface and are movable through the pipe, having an intermediate zone between the two pigs for receiving coating material, whereupon during the movement the material between the pigs is pressurized and the coating material is forced out of the intermediate zone onto the internal surfaces of the pipe, characterized in that a spraying device which is movable through the pipe is connected to the intermediate zone between the pigs via a material feed line, said spraying device comprising a rotary nozzle which is rotatably driven by means of compressed air from the compressed air reservoir.

14. Apparatus for internally coating pipes having a first and a second pig which engage the internal pipe surfaces and are movable through the pipe, having an intermediate zone between the two pigs for receiving coating material, whereup during the movement the material between the pigs is pressurized and the coating material is forced out of the intermediate zone onto the internal surfaces of the pipe, characterized in that a spraying device which is movable through the pipe is connected to the intermediate zone between the pigs via a material feed line and sprays coating material from the intermediate zone where an electric booster pump is provided which enhances the flow of coating material from the intermediate zone through the material feed line to the nozzle of the spraying device.

15. Apparatus for internally coating pipes having a first and a second pig which engage the internal pipe surfaces and are movable through the pipe, having an intermediate zone between the two pigs for receiving coating material, whereupon during the movement the material between the pigs is pressurized and the coating material is forced out of the intermediate zone onto the internal surfaces of the pipe, characterized in that a spraying device which is movable through the pipe is connected to the intermediate zone between the pigs via a material feed line, with a metering valve arranged therein, and sprays coating material from the intermediate zone.

* * * * *

UNITED STATES PATENT AND TRADEMARK OFFICE
CERTIFICATE OF CORRECTION

PATENT NO. : 4,774,905
DATED : October 4, 1988
INVENTOR(S) : August Nobis

It is certified that error appears in the above-identified patent and that said Letters Patent is hereby corrected as shown below:

Column 1, line 27, "with material" should be --with a material--

Column 3, line 22, "22 which" should be --22 to which--

Column 3, line 65, "sbutoff" should be --shutoff--

Claim 12, line 8, "at one of" should be --at one end of--

Claim 14, line 6, "whereup" should be --whereupon--

Signed and Sealed this

Ninth Day of May, 1989

Attest:

DONALD J. QUIGG

*Attesting Officer*  *Commissioner of Patents and Trademarks*